Werner Hausmann
Richard Vogel
INVENTORS.

BY Karl F. Ross
AGENT.

Werner Hausmann
Richard Vogel
INVENTORS.

BY Karl F. Ross

AGENT.

Jan. 2, 1962 W. HAUSMANN ET AL 3,015,344
HYDRAULIC CONTROL VALVE

Filed May 25, 1959 4 Sheets-Sheet 4

Werner Hausmann
Richard Vogel
INVENTORS.

BY  Karl F. Ross
AGENT.

United States Patent Office 3,015,344
Patented Jan. 2, 1962

3,015,344
HYDRAULIC CONTROL VALVE
Werner Hausmann, Uthleben, near Nordhausen, and Richard Vogel, Nordhausen, Germany, assignors to VEB Schlepperwerk Nordhausen, Nordhausen, Harz, Germany, a corporation of Germany
Filed May 25, 1959, Ser. No. 815,499
Claims priority, application Germany May 24, 1958
12 Claims. (Cl. 137—624)

Our present invention relates to a regulating apparatus for hydraulically actuated loads in general, and, more particularly, to the actuation of hydraulic lift devices such as those in common use on tractors, earth-moving machinery and other types of construction and land-working equipment.

Typical hydraulic controls for earth-moving machinery can be used in the following four positions: Up, down, stop, and neutral (or floating). Heretofore it has not been possible to couple these four actions in a single, simple control device. The best of earlier devices were able to accommodate only some of these positions in one plane of motion. The remaining positions necessitated a displacement of the control lever in a second plane of motion. These conventional devices have the disadvantage that they require time-consuming and expensive construction, maintenance, and assembly.

An object of our present invention is to provide a compact control device for hydraulic installations which accommodates all four functioning positions in one plane of rotation.

A further object of this invention is to permit a single control device to regulate more than one system of hydraulic working cylinders.

Another object of the invention is to provide a hydraulic system in which a single lever may be displaced in one plane between a plurality of operating positions controlling one set of working cylinders and may similarly be shifted in another plane of motion to control another set of working cylinders in analogous manner.

A more particular object of this invention is to provide means for automatically restoring a hydraulic controller for three-point hitches or other lifting devices to an inactive position whenever the controlled device reaches a predetermined elevation.

The invention accomplishes the above objects through the provision of a preferably cylindrical valve member rotatable within a housing member, one of these two members (generally the housing) being provided with a plurality of ports while the other member has a pair of independent channels selectively communicating with these ports at axially spaced locations in different relative angular positions of the two members. Advantageously, one of the channels may be formed as an internal duct extending axially within the cylinder and opening into a chamber of the housing which is in permanent communication with one of the several ports, such as an outlet port, while the other channel is in the form of a longitudinally extending peripheral recess, or preferably two such recesses at diametrically opposite locations, terminating short of the said chamber.

It will be convenient to form the cylinder with a number of axially spaced-apart radial passages or bores adapted to communicate with similar bores in a surrounding sleeve within the housing. Some of these bores may be made narrower than others in order to provide a restricted passage which will retard the downward movement of the load and/or which will damp the movements of the load in its "floating" position.

These and other objects, features and advantages will become more fully apparent from the following description, reference being made to the accompanying drawing in which.

Figure 1:
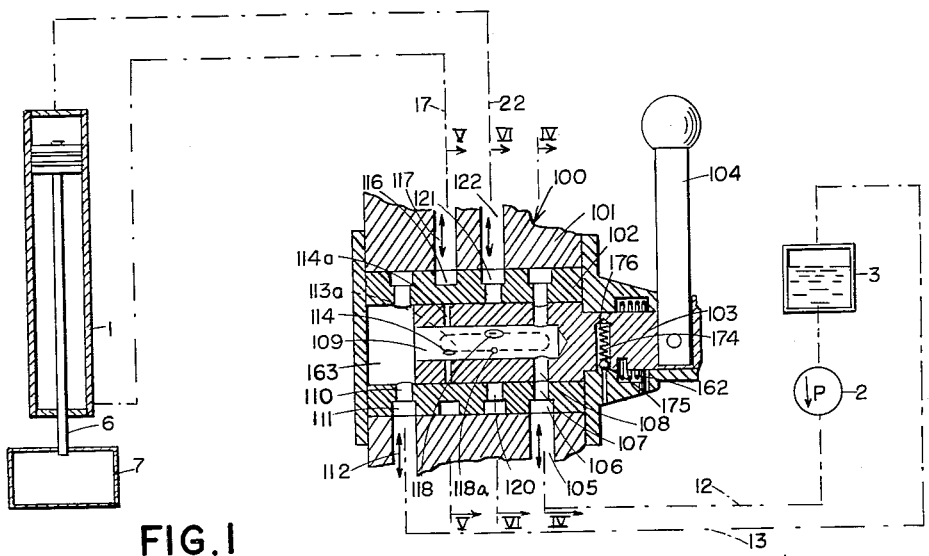
FIG. 1 is a longitudinal section of a control device for hydraulic installations according to our invention.

FIG. 1 shows a housing 100 comprising a block 101 and a sleeve 102 in that block. Housing 100 contains a distributing cylinder 103 rotatable relatively to it. A control member in the form of a lever 104 is rigidly secured to cylinder 103 which, like sleeve 102, is provided with numerous radial passages forming pathways for a hydraulic fluid. The pathways of sleeve 102 include annular grooves 106, 111, 116, 121 and radial bores 107 and 107a, 110, 161, 120 respectively communicating therewith. These bores are axially and angularly offset from one another for permanent communication with an inlet port 105, an outlet port 112, and intermediate ports 117 and 122, respectively, in block 101. Outer bores 107 and 107a, 161, 120 are selectively alignable with respective inner bores 108, 114 and 114a, 118 and 118a in cylinder 103 whose central duct 109 communicates with these latter bores as well as with a chamber 163 opening into outer bore 110.

In the "stop" position (FIG. 4) a hydraulic fluid such as oil is delivered under pressure from a reservoir 3 by a pump 2 through a conduit 12 into inlet port 105 in block 101, annular groove 106 in sleeve 102, radial bore 107 in that sleeve, and radial bore 108 in cylinder 103, aligned with bore 107, into central duct 109 extending axially within cylinder 103. From duct 109, the oil flows via chamber 163 and radial bore 110 in sleeve 102, annular groove 111 thereof and outlet port 112 in block 101 to reservoir 3. Ports 117 and 122 in block 101, connected via fluid-transmission tubes 17 and 22 respectively to a hydraulic cylinder 1 whose piston 6 is attached to a load 7, remain closed.

Figure 4:
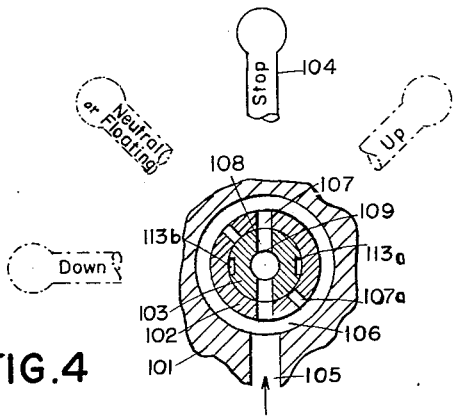
FIG. 4 is a section taken along line IV—IV of FIG. 1.
Figure 5:
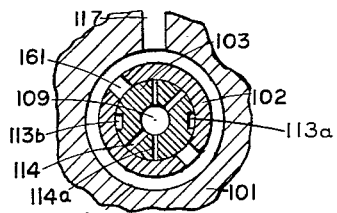
FIG. 5 is a section taken along line V—V of FIG. 1.
Figure 6:
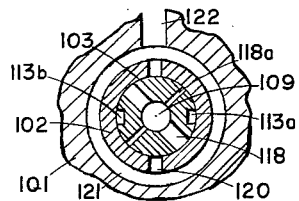
FIG. 6 is a section taken along line VI—VI of FIG. 1.

When it is desired to raise the load 7, lever 104 is rotated clockwise, as viewed in FIGS. 4–6, from its normal "stop" position to the position "up" and oil is caused to flow under pressure from reservoir 3 through conduit 12, inlet 105 in block 101, annular groove 106, bore 107a in sleeve 102, longitudinal channels 113a, 113b in cylinder 103, bore 161 (FIG. 5) in sleeve 102, annular groove 116 in that sleeve to port 117 in block 101, thence through tube 17 to the lower end of hydraulic cylinder 1 to elevate its piston 6.

The return stream of oil flows from the top of cylinder 1 through tube 22 to port 122 in block 101 and thence through annular groove 121 in sleeve 102, bore 120 in that sleeve, bore 118 in cylinder 103 into central duct 109. From duct 109 the oil returns to reservoir 3 in the manner stated above. Upon the release of lever 104, a restoring spring 162 applies a torque tending to return cylinder 103 to the "stop" position in which it is yieldably retained by an indexing member in the form of a ball check 175 urged by a helical spring 174 into a recess 176 in housing 100. In the absence of such indexing means, the tendency of spring 162 would be to turn the lever 104 into a position midway between those designated "stop" and "neutral."

When control member 104 is rotated in a counterclockwise direction to its "neutral" or "floating" position, the oil is able to flow from the lower end of cylinder 1 via conduit 17 through port 117 and thence through fluid pathways 116, 161, 114a, 109, 118a, 120, 121 to port 122 and back to the upper end of cylinder 1. It should be noted that bore 118a, serially included in the fluid path, constitutes a restricted fluid passage serving to damp any spontaneous motion of the load while permitting the manual raising or lowering thereof. A certain damping effect is also provided by the fact that the duct 109, which is serially included in the aforementioned pathways, is simultaneously traversed by fluid circulating from the high-pressure side of source 2, 3 back to the low-pressure side thereof via inlet and outlet ports 105 and 112. The flow of this high-pressure fluid, through a bypass including pathways 105, 107a, 108, 109, 110 and 111, is countercurrent to that of the fluid from hydraulic cylinder 1 in the case of a descending piston, this arrangement thus serving to maintain the load 7 completely or approximately stationary against the force of gravity.

To lower the load 7, control member 104 is rotated further in a counterclockwise direction (FIGS. 4–6) to its "down" position against the action of restoring spring 162, whereby oil is pumped through inlet 105 and fluid pathways 106, 107, 113a and 113b, 120, 121 to port 122 and thence to conduit 22 and the upper end of hydraulic cylinder 1, thereby depressing the piston 6. The hydraulic fluid returns from the lower end of cylinder 1 via conduit 17 through fluid pathways 116, 161, 114, 109, 110, 111 and outlet 112 to the reservoir 3. It will be seen that bore 114 is narrower than either of bores 108 and 118 so as to exert a braking effect upon the downward movement of piston 6 and load 7. When control lever 104 is released, restoring spring 162 returns cylinder 103 to the "neutral" position which is indexed in the same manner as the "stop" position.

Figure 2:
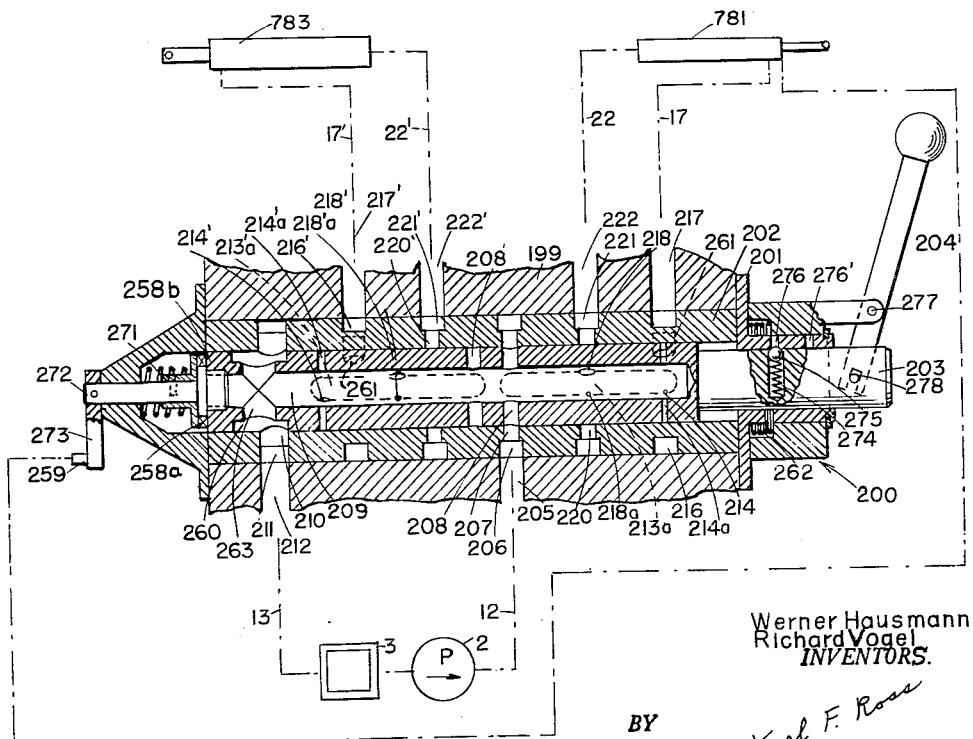
FIG. 2 is a longitudinal section, similar to FIG. 1, of a second embodiment.
Figure 3:
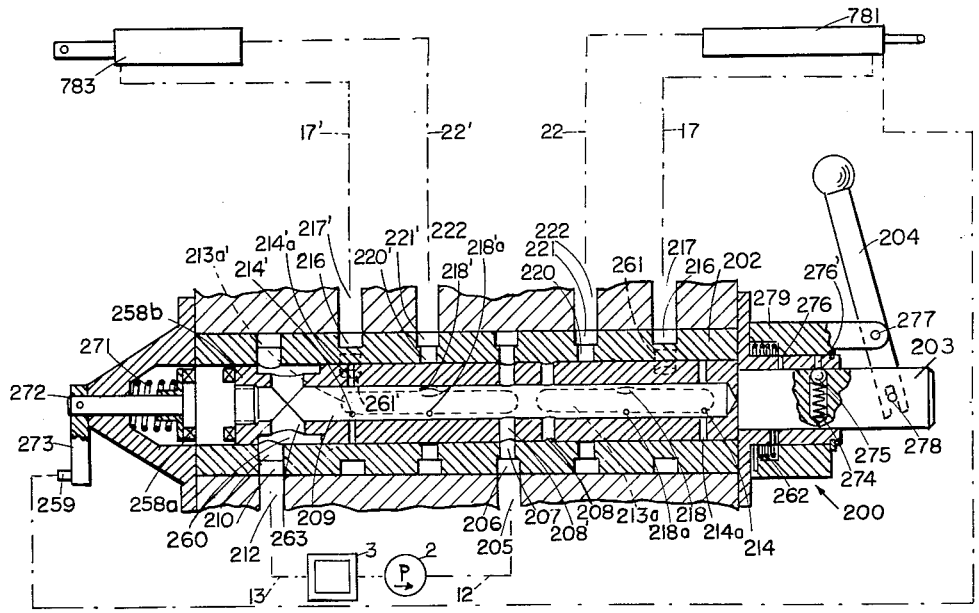
FIG. 3 is a longitudinal section of the embodiment of FIG. 2 in another stage of operation.

FIGS. 2 and 3 show an embodiment of our invention which operates in a manner similar to that described in connection with FIG. 1 but is able to control two separate, independent working cylinders. The reference numerals of FIGS. 2 and 3 having the same tens and units digits as those of FIG. 1 refer to analogous components. Primed and unprimed numerals designate corresponding parts of the control device respectively associated with the two working cylinders.

A control device 200, operatively connected via conduits 17, 22 and 17', 22' to hydraulic cylinders 781 and 783 respectively, is serially connected with these cylinders, a pump 2 and a reservoir 3. The device is provided with a housing 199 comprising a block 201, a sleeve 202 within that block and a distributing cylinder 203 rotatable relatively to the housing.

A control lever 204 is pivotably secured by a pin 278 to distributing cylinder 203 and rotatably fastened by a fulcrum pin 277 to the housing 199. Block 201 contains an inlet port 205, an outlet port 212, and intermediate ports 217, 222 and 217, 222' permanently communicating with annular grooves 206, 211, 216, 221, 216', 221', respectively, in sleeve 202. The pathways of sleeve 202 further include radial bores 207, 210, 261, 220, 261', 220' respectively aligned with these grooves. Outer bores 207, 220, 261, 220', 261' are selectively alignable with inner bores 208, 218 and 218a, 214 and 214a, 218' and 218'a, 214' and 214'a, respectively in cylinder 203 whose central duct 209 communicates with these latter bores; chamber 263 opens into outer bore 210 and into central duct 209.

When control lever 204 in its "stop" position (illustrated for the lever 104 in FIGS. 1 and 4–6) is axially displaced to its extreme right-hand position as seen in FIG. 2, thereby shifting distributing cylinder 203 to the left, oil flows through inlet 205, annular groove 206, aligned bores 207 and 208, central duct 209 extending axially within cylinder 203, chamber 263, annular groove 260, radial bore 210, annular groove 211 and outlet 212 to the reservoir 3. Ports 217 and 222 and their respective fluid-transmission tubes 17 and 22 are isolated from the oil flow, and hydraulic cylinder 781 which is shown operatively connected to a three-point hitch 785 of a plow 790 (FIG. 7) is not actuated. By rotating control lever 204 either clockwise or counterclockwise, all four previously described operating conditions ("up," "down," "neutral" and "stop") may be realized.

Figure 7:
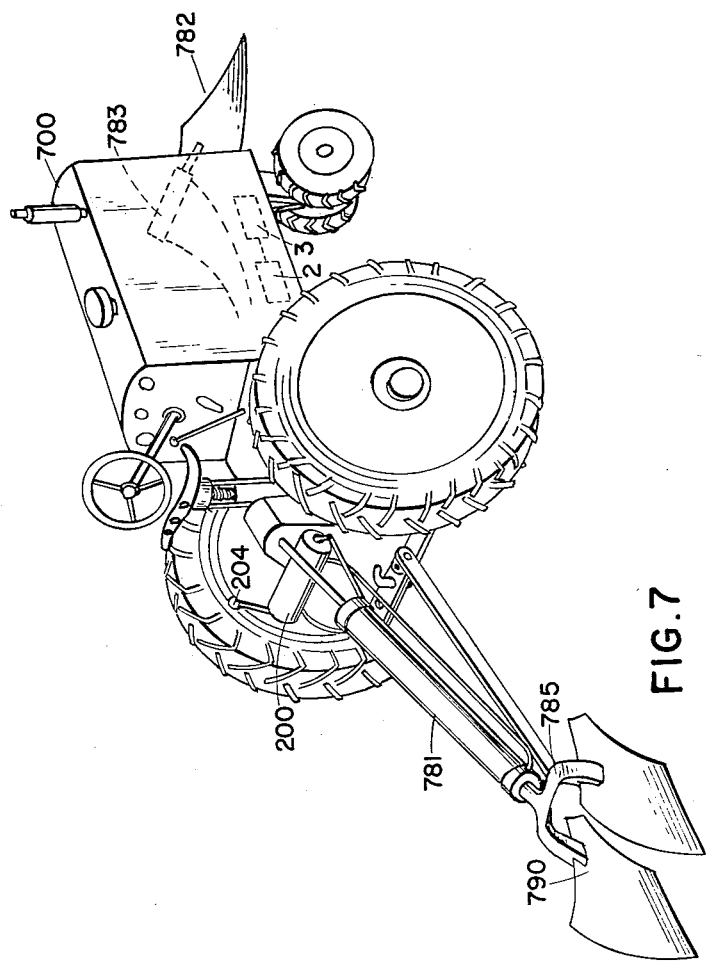
FIG. 7 is a perspective view of a vehicle mounting a hydraulic control device according to our invention.

When lever 204 is axially displaced into its extreme left-hand position FIG. 3, distributing cylinder 203 permits a second, independent hydraulic cylinder 783 to be operated, e.g. for the purpose of raising and lowering a dozer blade 782 (FIG. 7). In this case, oil flow is directed by distributing cylinder 203 to the elements of the control device designated by primed numerals. Again, all four operating conditions may be used with hydraulic cylinder 783. It should be noted that, during the operation of cylinder 783, the load 785 associated with cylinder 781 will remain immobilized in the position in which it was last placed, the axial shift of cylinder 203 blocking the oil flow through the transmission tubes 17 and 22 as effectively as does the rotation of the lever 204 to its "stop" position. The same is true with regard to load 782 upon the return of cylinder 203 to its left-hand position.

A ball check 275 loaded by a spring 274 co-operates with four recesses, two of which are shown at 276 and 276', to index the distributing cylinder in one of its inactive ("stop" or "neutral") positions associated with either working cylinder 781, 783. If desired, similar indexing means including two circular grooves may of course be provided for yieldably retaining the cylinder 203 in either of its axial positions irrespectively of its angular position.

Figure 8:
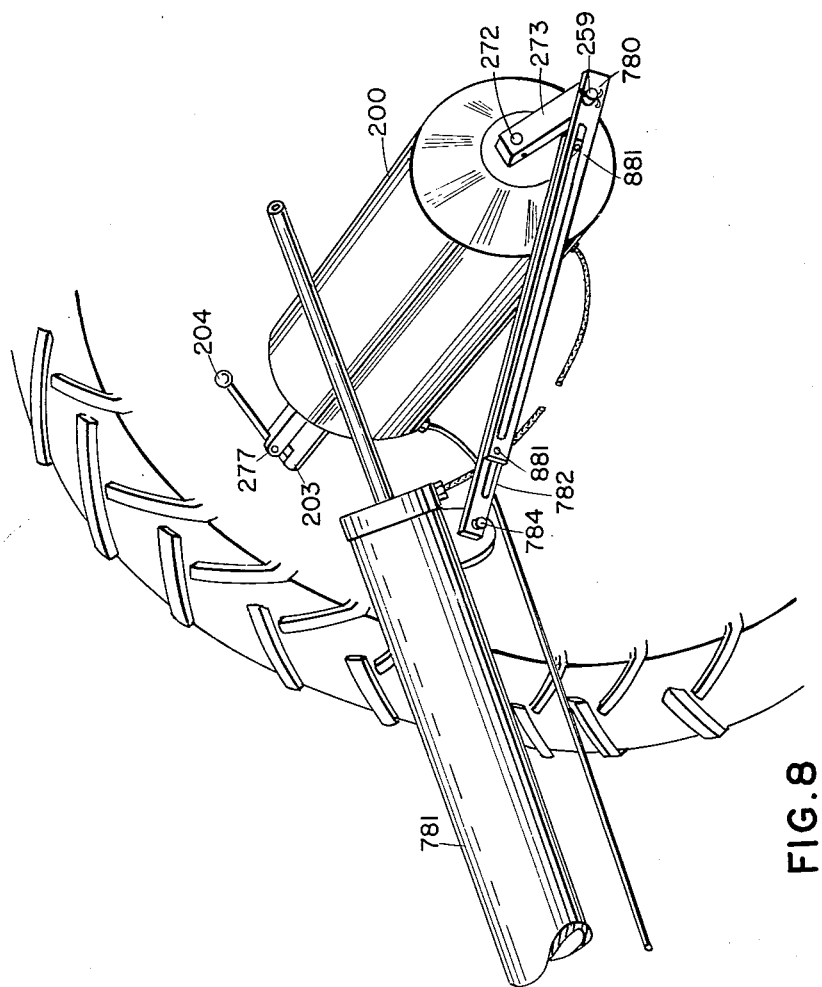
FIG. 8 is a side-elevational view of a detail of FIG. 7.

FIG. 7 shows a tractor 700 operatively mounting the control device 200 of FIGS. 2 and 3, the plow 790 being attached to the tractor by the three-point hitch 785 coupled with hydraulic cylinder 781. The dozer blade 782 is also attached to the tractor 700 in operative relationship with hydraulic cylinder 783. Pump 2 and fluid reservoir 3 are mounted under the hood of the tractor 700 and operatively connected to its drive mechanism. FIG. 8 shows in further detail the connective arrangement between the three-point-hitch cylinder 781 and the control device 200.

Cylinder 781 is articulated to a lost-motion linkage 780 which is hinged via a pin 259 (see also FIGS. 2 and 3) to an arm 273 rigidly secured to a shaft 272. Shaft 272 is axially displaceable against the force of a restoring spring 271. A clutch face 258a on shaft 272 engages a complementary clutch face 258b on cylinder 203 whenever the latter is shifted completely to the left. Upon such engagement, the suitably dimensioned linkage 780 acts upon the arm 273 in a manner positively deflecting the distributing cylinder 203 from its active angular position ("up" or "down") whenever the three-point hitch 785 reaches a predetermined level of elevation.

As will be understood from the foregoing description, a hydraulic device as herein disclosed may be provided with more than two axial positions so as to be usable for the control of a larger number of loads. These and other features of our invention will be readily apparent to persons skilled in the art and are intended to be embraced in the scope of the invention as defined in the appended claims.

We claim:

1. A control device for hydraulic installations, comprising a housing member, a rotatable valve member within said housing member, control means for rotating said members relatively to each other, one of said members being provided with a first, a second, a third and a fourth port, the other of said members being provided with a first and a second channel separated from each other, said first channel being accessible at four axially spaced locations, said second channel being accessible at three axially spaced locations, said first channel communicating respectively with said first, second and third ports in a first, a second and a third relative angular position of said members and with said fourth port in all three of said angular positions, said second channel communicating respectively with said second and third ports in each of the two last-mentioned positions, first conduit means connecting one of said ports to a source of hydraulic fluid under pressure, second conduit means connecting another of said ports to a sink for said fluid, and fluid-transmission means connecting the remaining two ports to opposite sides of a load.

2. A control device according to claim 1 wherein both said second and third ports communicate with one of said channels in a fourth relative angular position of said members.

3. A control device for hydraulic installations, comprising a housing member, a rotatable valve member within said housing member, control means for rotating said members relatively to each other, one of said members being provided with an inlet port, a first intermediate port, a second intermediate port and an outlet port, the other of said members being provided with a first and a second channel separated from each other, said first channel being accessible at four axially spaced locations, said second channel being accessible at three axially spaced locations, said first channel communicating with said inlet port and said first and second intermediate ports in respectively a first, a second and a third relative angular position of said members and with said outlet port in all three of said angular positions, said second channel communicating with said first and second intermediate ports in respectively said third and second angular positions and with said inlet port in each of the two last-mentioned positions, first conduit means connecting said inlet port to a source of hydraulic fluid under pressure, second conduit means connecting said outlet port to a sink for said fluid, and fluid-transmission means connecting said intermediate ports to opposite sides of a load.

4. A control device according to claim 3 wherein said other of said members is further provided with pathways communicating with said intermediate ports in a fourth relative angular position of said members and forming a restricted passage for the flow of said fluid at a reduced rate to and from said load.

5. A control device according to claim 4 wherein said pathways include said first channel.

6. In a hydraulic installation, in combination, a housing; a distributing cylinder rotatably positioned within said housing; control means for rotating said cylinder; said housing being provided with a chamber adjacent said cylinder and with an inlet port, a first intermediate port, a second intermediate port and an outlet port axially spaced from one another, said outlet port opening into said chamber; said cylinder being provided with at least one axially extending central duct opening into said chamber and with at least one longitudinal peripheral channel separated from said duct and terminating short of said chamber, said cylinder being further provided with a first, a second and a third radial passage opening into said duct at axially spaced locations; said first passage communicating with said inlet port, said second passage communicating with said first intermediate port and said third passage communicating with said second intermediate port in a first, a second and a third rotary position, respectively, of said cylinder; said channel communicating with said first and second intermediate ports in said third and second rotary positions, respectively, and with said inlet port in both of the last-mentioned positions; a hydraulic cylinder having a piston connected with a load; a source of hydraulic fluid under pressure; first conduit means connecting said inlet port to the high-pressure side of said source; second conduit means connecting said first intermediate port to said hydraulic cylinder on one side of said piston; third conduit means connecting said second intermediate port to said hydraulic cylinder on the other side of said piston; and fourth conduit means connecting said outlet port to the low-pressure side of said source.

7. The combination according to claim 6 wherein said piston is adapted to raise and to lower said load upon said fluid entering said hydraulic cylinder respectively through said third and said second conduit means, said third passage being more restricted than said first and second passages.

8. The combination according to claim 6 wherein said distributing cylinder is further provided with fourth and fifth radial passages respectively co-planar with but angularly offset from said second and third passages, said fourth and fifth passages communicating with said first and second intermediate ports, respectively, in a fourth rotary position of said cylinder.

9. The combination according to claim 8 wherein said fourth and fifth passages are more restricted than any of the remaining passages.

10. The combination according to claim 8, further comprising indexing means for releasably maintaining said distributing cylinder in either of said first and fourth positions, and restoring means tending to rotate said cylinder from said second and third positions into said first and fourth positions, respectively.

11. The combination according to claim 8 wherein said piston is adapted to lower and to raise said load upon said fluid entering said hydraulic cylinder respectively through said second and said third conduit means, said first, second and third passages being positioned progressively closer to said chamber whereby fluid driven by a descent of said load from said third to said second passage in said fourth rotary position flows countercurrent to fluid delivered by said source.

12. A control device for hydraulic installations, comprising a housing member, a valve member rotatable and axially shiftable in said housing member, control means for displacing said members relatively to each other, one of said members being provided with a first, a second and a third port, the other of said members being provided with an axially extending channel communicating with said first port in a first relative position of said members and with said second port in a second relative position of said members axially displaced from said first position, said third port communicating with said channel in both of said relative positions, said members being relatively rotatable from said first and second positions into other positions in which said first and second ports are disconnected from said third port, first conduit means connecting said first port to a first load, second conduit means connecting said second port to a second load, and third conduit means connecting said third port to a source of hydraulic fluid under pressure.

References Cited in the file of this patent

UNITED STATES PATENTS

| | | |
|---|---|---|
| 679,533 | Moore | July 30, 1901 |
| 916,262 | Brocke | Mar. 23, 1909 |
| 1,099,161 | Brown | June 9, 1914 |
| 1,947,973 | Davis | Feb. 20, 1934 |
| 2,165,096 | Frechette | July 4, 1939 |
| 2,221,462 | Trambley | Nov. 12, 1940 |
| 2,407,812 | Cain | Sept. 17, 1946 |
| 2,439,515 | Hodgson | Apr. 13, 1948 |
| 2,541,958 | Deardorff et al. | Feb. 13, 1951 |
| 2,649,076 | Dupre | Aug. 18, 1953 |
| 2,777,426 | Steele | Jan. 15, 1957 |
| 2,863,290 | Verderber | Dec. 9, 1958 |
| 2,912,826 | Tan | Nov. 17, 1959 |